(12) United States Patent
Sester

(10) Patent No.: US 9,764,678 B1
(45) Date of Patent: *Sep. 19, 2017

(54) TRIAXIALLY BRAIDED STRAP AND METHODS FOR BRAIDING TRIAXIALLY BRAIDED STRAP

(71) Applicant: Atkins & Pearce, Inc., Covington, KY (US)

(72) Inventor: Stephen Sester, Ft. Thomas, KY (US)

(73) Assignee: Atkins & Pearce, Inc., Covington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,657

(22) Filed: Dec. 10, 2015

Related U.S. Application Data

(63) Continuation of application No. 14/485,869, filed on Sep. 15, 2014, now Pat. No. 9,242,593.

(60) Provisional application No. 61/903,933, filed on Nov. 13, 2013.

(51) Int. Cl.
*B60P 7/08* (2006.01)
*D04C 1/12* (2006.01)

(52) U.S. Cl.
CPC .............. *B60P 7/0876* (2013.01); *D04C 1/12* (2013.01)

(58) Field of Classification Search
CPC ................................ B60P 7/0876; D04C 1/12
USPC ................... 410/96, 97, 100, 117, 118, 129; 112/475.26; 139/419; 87/3, 7, 8, 10
See application file for complete search history.

(56) References Cited

U.S. PATENT DOCUMENTS

| | | | |
|---|---|---|---|
| 2,948,182 A | 8/1960 | Huppertsberg | |
| RE28,155 E | 9/1974 | Dow | |
| 4,900,204 A * | 2/1990 | Summers | B60P 7/0876 410/97 |
| 5,800,543 A | 9/1998 | McLeod et al. | |
| 6,250,193 B1 | 6/2001 | Head | |
| 6,419,432 B1 * | 7/2002 | Chou | B60P 7/0876 410/118 |
| 6,431,497 B1 | 8/2002 | Hoyt et al. | |
| 7,195,434 B1 | 3/2007 | Kuo | |
| 8,419,329 B1 | 4/2013 | Bullock | |
| 9,242,593 B1 * | 1/2016 | Sester | B60P 7/0876 410/118 |

FOREIGN PATENT DOCUMENTS

WO 2007147594 A1 12/2007

* cited by examiner

*Primary Examiner* — Stephen Gordon
(74) *Attorney, Agent, or Firm* — Ulmer & Berne LLP

(57) ABSTRACT

A triaxially braided strap includes a plurality of axial strands and a plurality of longitudinal strands including a first boundary strand and a second boundary strand. Each strand of the plurality of axial strands is routed, in a repeating pattern and in the following order: under the first boundary strand; around the first boundary strand; between respective portions of a pair of axial strands that are routed between the first boundary strand and the second boundary strand; under the second boundary strand; around the second boundary strand; and between respective portions of a pair of axial strands that are routed between the second boundary strand and the first boundary strand.

12 Claims, 3 Drawing Sheets

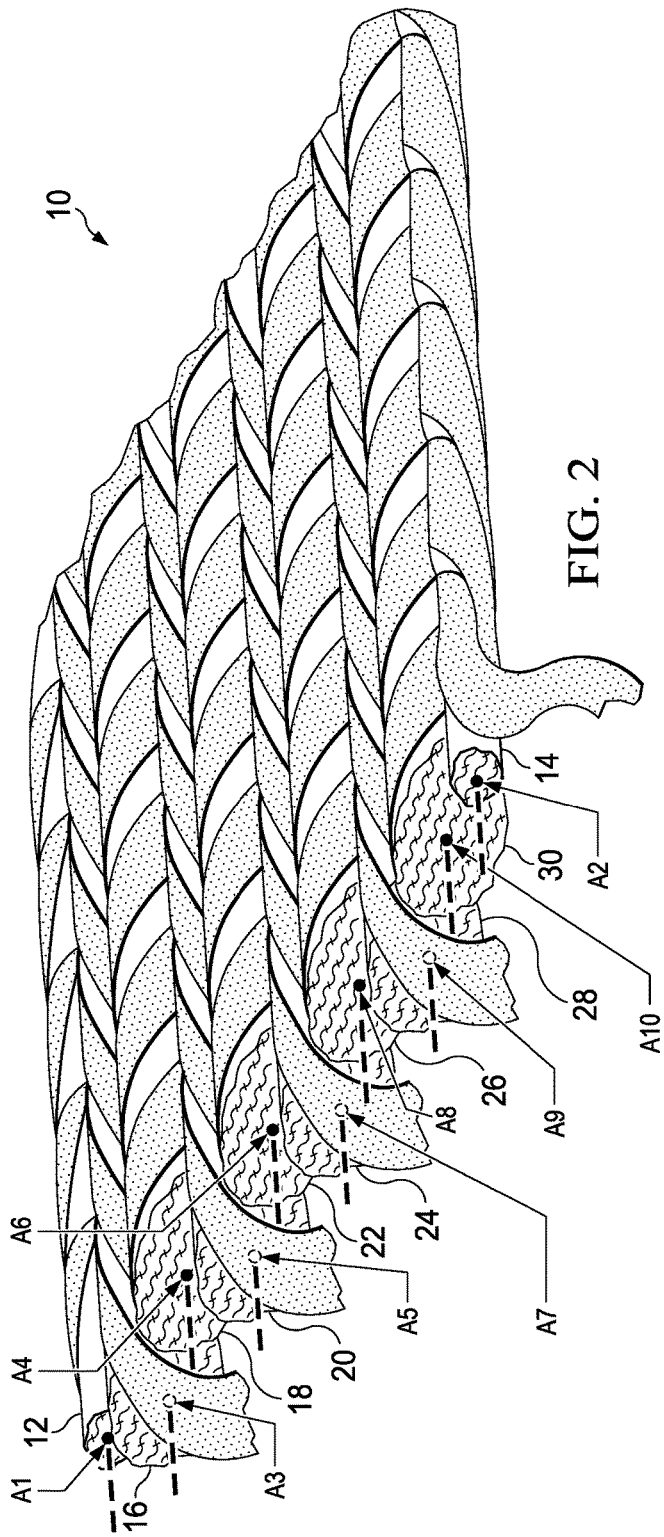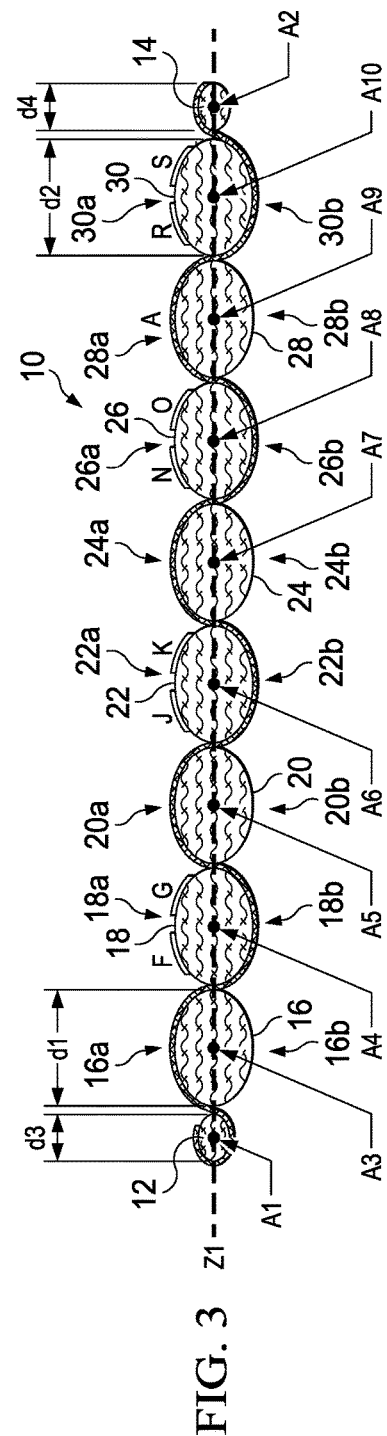

# TRIAXIALLY BRAIDED STRAP AND METHODS FOR BRAIDING TRIAXIALLY BRAIDED STRAP

REFERENCE TO RELATED APPLICATION

This application is a continuation of U.S. patent application Ser. No. 14/485,869, entitled "Triaxially Braided Strap and Methods for Braiding Triaxially Braided Strap," filed Sep. 15, 2014, which issued as U.S. Pat. No. 9,242,593 on Jan. 26, 2016, and which claims priority of U.S. provisional application Ser. No. 61/903,933, filed Nov. 13, 2013, and hereby incorporates each of these applications herein by reference in their entireties.

TECHNICAL FIELD

The systems and methods described below generally relate to the field of triaxially braided straps. More particularly, the systems and methods relate to triaxially braided straps that include a plurality of axial strands and a plurality of longitudinal strands.

BACKGROUND

Some conventional tension support members include longitudinal strands that bear at least some of the tension applied to the tension support members.

SUMMARY

In accordance with one embodiment, a triaxially braided strap comprises a plurality of axial strands, a first boundary strand, a second boundary strand, a first interior longitudinal strand, and a second interior longitudinal strand. Each of the first boundary strand, the second boundary strand, the first interior longitudinal strand, and the second interior longitudinal strand are substantially parallel to one another. Each strand of the plurality of axial strands is routed, in a repeating pattern and in the following order: under the first interior longitudinal strand; between respective portions of a first pair of axial strands that are routed between the first interior longitudinal strand and the first boundary strand; over the first boundary strand; around the first boundary strand to at least partially wrap the first boundary strand; between respective portions of a second pair of axial strands that are routed between the first boundary strand and the first interior longitudinal strand; over the first interior longitudinal strand; between respective portions of a third pair of axial strands that are routed between the first interior longitudinal strand and the second interior longitudinal strand; under the second interior longitudinal strand; between respective portions of a fourth pair of axial strands that are routed between the second interior longitudinal strand and the second boundary strand; over the second boundary strand; around the second boundary strand to at least partially wrap the second boundary strand; between respective portions of a fifth pair of axial strands that are routed between the second boundary strand and the second interior longitudinal strand; over the second interior longitudinal strand; and between respective portions of a sixth pair of axial strands that are routed between the second interior longitudinal strand and the first interior longitudinal strand. The first interior longitudinal strand and the second interior longitudinal strand are disposed between the first boundary strand and the second boundary strand. The first boundary strand and the second boundary strand are the outermost longitudinal strands.

In accordance with another embodiment, a method for braiding a triaxially braided strap is provided. The method comprises routing an axial strand, in a repeating pattern and in the following order: under a first interior longitudinal strand; between respective portions of a first pair of axial strands that are routed between the first interior longitudinal strand and a first boundary strand; over the first boundary strand; around the first boundary strand to at least partially wrap the first boundary strand; between respective portions of a second pair of axial strands that are routed between the first boundary strand and a first interior longitudinal strand; over the first interior longitudinal strand; between respective portions of a third pair of axial strands that are routed between the first interior longitudinal strand and a second interior longitudinal strand; under the second interior longitudinal strand; between respective portions of a fourth pair of axial strands that are routed between the second interior longitudinal strand and a second boundary strand; over the second boundary strand; around the second boundary strand to at least partially wrap the second boundary strand; between respective portions of a fifth pair of axial strands that are routed between the second boundary strand and the second interior longitudinal strand; over the second interior longitudinal strand; and between respective portions of a sixth pair of axial strands that are routed between the second interior longitudinal strand and the first interior longitudinal strand.

In accordance with another embodiment, a triaxially braided strap comprises a plurality of axial strands and a plurality of longitudinal strands oriented substantially parallel to one another. The plurality of longitudinal strands comprises a first boundary strand and a second boundary strand. Each strand of the plurality of axial strands is routed, in a repeating pattern and in the following order: under the first boundary strand; around the first boundary strand; between respective portions of a pair of axial strands that are routed between the first boundary strand and the second boundary strand; under the second boundary strand; around the second boundary strand; and between respective portions of a pair of axial strands that are routed between the second boundary strand and the first boundary strand.

BRIEF DESCRIPTION OF THE DRAWINGS

It is believed that certain embodiments will be better understood from the following description taken in conjunction with the accompanying drawings in which:

FIG. 2 is side perspective view, shown partially in fragment depicting a portion of the triaxially braided strap of FIG. 1;

FIG. 3 is a cross-sectional view of the triaxially braided strap of FIG. 1 taken along line 3-3 in FIG. 1.

DETAILED DESCRIPTION

Figure 1:
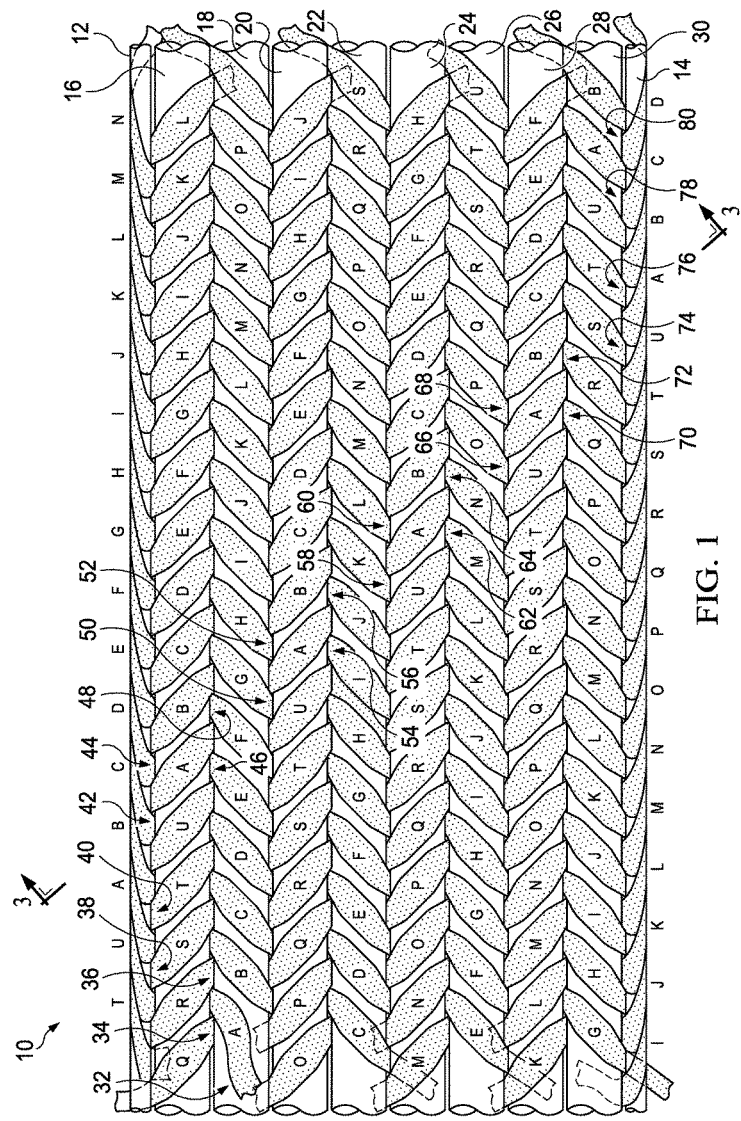
FIG. 1 is a top plan view depicting a portion of a triaxially braided strap in accordance with one embodiment.

In connection with the views and examples of FIGS. 1-3, wherein like numbers indicate the same or corresponding elements throughout the views, FIG. 1 illustrates a top plan view of a strap 10 in a flat-out state that is shown to be a triaxially braided strap. The strap 10 can be provided for use in any of a variety of suitable applications, such as, for example, as a retention strap, as a tow strap, or as a lift strap. As illustrated in FIG. 1, the strap 10 can comprise a first boundary strand 12, a second boundary strand 14, a plurality of pairs of interior longitudinal strands (shown as interior longitudinal strands 16, 18, 20, 22, 24, 26, 28, 30) and a plurality of axial strands (shown as axial strands A-U). Each of the first boundary strand 12, the second boundary strand 14, the interior longitudinal strands 16, 18, 20, 22, 24, 26, 28, 30, and the axial strands A-U can comprise a bundle of fibers. It will be appreciated that general reference to longitudinal strands herein can be understood to mean each of the first boundary strand 12, the second boundary strand 14, the interior longitudinal strands 16, 18, 20, 22, 24, 26, 28, 30.

Each of the axial strands A-U can be routed about the first boundary strand 12, the second boundary strand 14, and the plurality of interior longitudinal strands 16, 18, 20, 22, 24, 26, 28, 30 to form a triaxial braid. For the purposes of illustration, the routing of axial strand A will now be described with respect to the remaining axial strands B-U, the boundary strands, and the longitudinal strands to facilitate formation of a triaxial braid.

Beginning at reference number 32, the axial strand A can be routed, in a repeating pattern and in the following order over the length of the strap 10: over the interior longitudinal strand 18; between respective portions 34, 36 of the axial strands Q and R that are routed between the interior longitudinal strands 16, 18; under the interior longitudinal strand 16; between respective portions 38, 40 of the axial strands S and T that are routed between the interior longitudinal strand 16 and the first boundary strand 12; over and around the first boundary strand 12 such that the first boundary strand 12 is partially wrapped by the axial strand A, between respective portions 42, 44 of the axial strands C and D that are routed between the first boundary strand 12 and the interior longitudinal strand 16; over the interior longitudinal strand 16; between respective portions 46, 48 of the axial strands E and F that are routed between the interior longitudinal strands 16, 18; under the interior longitudinal strand 18; between respective portions 50, 52 of the axial strands G and H that are routed between the interior longitudinal strands 18, 20; over the interior longitudinal strand 20; between respective portions 54, 56 of the axial strands I and J that are routed between the interior longitudinal strands 20, 22; under the interior longitudinal strand 22; between respective portions 58, 60 of the axial strands K and L that are routed between the interior longitudinal strands 22, 24; over the interior longitudinal strand 24; between respective portions 62, 64 of the axial strands M and N that are routed between the interior longitudinal strands 24, 26; under the interior longitudinal strand 26; between respective portions 66, 68 of the axial strands O and P that are routed between the interior longitudinal strands 26, 28; over the interior longitudinal strand 28, between respective portions 70, 72 of the axial strands Q and R that are routed between the interior longitudinal strands 28 and 30; under the interior longitudinal strand 30; between respective portions 74, 76 of the axial strands S and T that are routed between the interior longitudinal strand 30 and the second boundary strand 14; under and around the second boundary strand 14 such that the second boundary strand 14 is partially wrapped by the axial strand A, between respective portions 78, 80 of the axial strands C and D that are routed between the second boundary strand 14 and the interior longitudinal strand 30; and over the interior longitudinal strand 30. It will be appreciated that each of the axial strands B-U of the strap 10 can be routed in a similar manner as described for the axial strand A, as generally shown in FIG. 1. The axial strands A-U can cooperate with each other to form a basket-weave type arrangement between the longitudinal strands. It is also to be appreciated that, although the strap 10 is shown to have 21 axial strands and 4 pairs of interior longitudinal strands, a strap can be formed having any of a variety of other suitable quantities of axial strands and pairs of longitudinal strands. For example, in one embodiment, a strap can be formed with only one pair of longitudinal strands (e.g., boundary strands).

As illustrated in FIGS. 2 and 3, the first and second boundary strands 12, 14 can define respective longitudinal centerline axes A1 and A2 and each of the interior longitudinal strands 16, 18, 20, 22, 24, 26, 28, 30 can define respective longitudinal axes A3, A4, A5, A6, A7, A8, A9, A10. Each of the first boundary strand 12, the second boundary strand 14, and the plurality of interior longitudinal strands 16, 18, 20, 22, 24, 26, 28, 30 are shown to be generally parallel with each other such that each of the longitudinal centerline axes A1 and A2 and the longitudinal axes A3, A4, A5, A6, A7, A8, A9, A10 are generally parallel when the strap 10 is in a flat-out state. The strap 10 is also shown to define a lateral axis Z1 (FIG. 3) that intersects each of the longitudinal centerline axes A1 and A2 of the first and second boundary strands 12, 14. Each of the interior longitudinal strands 16, 18, 20, 22, 24, 26, 28, 30 can be provided in a generally planar arrangement such that a portion of each of the interior longitudinal strands 16, 18, 20, 22, 24, 26, 28, 30 intersects the lateral axis Z1. The interior longitudinal strands 16, 18, 20, 22, 24, 26, 28, 30 can remain in a generally planar relationship along the length of the strap 10, such that the longitudinal strands do not deviate substantially from the lateral axis Z1 as they extend along the length of the strap 10. In this regard, the longitudinal strands 16, 18, 20, 22, 24, 26, 28, 30 can be provided in a non-woven relationship with the axial strands A-U such that the longitudinal strands are substantially devoid of longitudinal crimping. The axial braids A-U can facilitate retention of the longitudinal strands 16, 18, 20, 22, 24, 26, 28, 30 such that the generally parallel and planar relationship among the longitudinal strands 16, 18, 20, 22, 24, 26, 28, 30 can be maintained entirely, or at least substantially entirely, along the length and width of the strap 10. It will be appreciated that the generally parallel relationship and the generally planar relationships among the longitudinal strands should be understood to mean the relationship between the longitudinal strands when the strap 10 is laid flat-out, as illustrated in FIGS. 2 and 3 (e.g., when a lateral and longitudinal axis of the strap 10 resides in the same imaginary plane over the width and length of the strap 10, respectively).

Referring again to FIG. 3, each of the interior longitudinal strands 16, 18, 20, 22, 24, 26, 28, 30 can have an upper portion 16a, 18a, 20a, 22a, 24a, 26a, 28a, 30a and a lower portion 16b, 18b, 20b, 22b, 24b, 26b, 28b, 30b that are defined by the lateral axis Z1 (e.g., each upper portion is disposed above the lateral axis Z1 and each lower portion is disposed below the lateral axis Z1). A portion of each of the axial strands A-U are routed along the upper portions 16a, 18a, 20a, 22a, 24a, 26a, 28a, 30a and the lower portions 16b, 18b, 20b, 22b, 24b, 26b, 28b, 30b of the longitudinal strands 16, 18, 20, 22, 24, 26, 28, 30. The portions of the axial strand A-U that are routed along each upper portion 16a, 18a, 20a, 22a, 24a, 26a, 28a, 30a can be substantially parallel with each other. Similarly, the portions of the axial strand A-U that are routed along each lower portion 16b, 18b, 20b, 22b, 24b, 26b, 28b, 30b can be substantially parallel with each other. For example, referring to the portion of the interior longitudinal strand 26 shown in FIG. 1, the axial strands F, E, D, C, B, A, U, T, S, R, Q, P, O, N, M, L, K are routed along the upper portion 26*a* of the interior longitudinal strand 26 and are substantially parallel with each other. Similarly, the axial strands B, A, U, T, S, R, Q, P, O, N, M, L, K, J, I, H, G are routed along the lower portion 26*b* (not shown) of the interior longitudinal strand 26 and are substantially parallel with each other.

When the strap 10 undergoes tension, a significant amount of the tension can be borne substantially by the longitudinal strands. As a result, the fibers of the first boundary strand 12, the second boundary strand 14, and the interior longitudinal strands 16, 18, 20, 22, 24, 26, 28, 30 can be selected to have a higher relative tensile strength than the fibers of the axial strands A-U. In one embodiment, the longitudinal strands can be formed of a fiber having a tenacity of greater than about 15 grams per denier (e.g., a high strength fiber) and the axial strands A-U can be formed of a fiber having a tenacity of less than about 15 grams per denier (e.g., a low strength fiber). In one embodiment, the longitudinal strands can be formed of one or more of an ultra-high molecular weight polyethylene (UHMWPE) fiber and an aramid fiber. UHMWPE can be any material resulting in UHMWPE molecules typically having between about 100,000 to about 250,000 monomer units per molecule, examples of which include DYNEEMA and SPECTRA. Some examples of an aramid fiber include KEVLAR, NOMEX and TECHNORA, for example. It will be appreciated however, that each of the longitudinal strands and each of the axial strands can be formed of any of a variety of other suitable materials or combinations thereof.

It is noted that, conventionally, the size and/or quantity of longitudinal strands incorporated into a tension support member, such as a strap, for example, can be selected based upon the break efficiency (e.g., actual break strength relative to the theoretical break strength) of the longitudinal strands (e.g., strength members) that are incorporated into the tension support member. The lower the break efficiency of the longitudinal strands, the more longitudinal strands need to be incorporated and/or the larger the longitudinal strands need to be to achieve a particular tensile strength, and thus increase the cost to produce the tension support member or strap. Increasing the quantity and/or size of the longitudinal strands can be costly and inefficient and can increase the overall size of the tension support member. It is to be appreciated that routing of the longitudinal strands in the manner described herein can enhance the break efficiency of the longitudinal fibers. As a result, straps produced in accordance with the systems and methods described herein can achieve a particular tensile strength with fewer/smaller longitudinal fibers. Furthermore, such straps can be manufactured more cost effectively and efficiently, and can result in a more lightweight product, than conventional arrangements.

An example of one such conventional arrangement is a sleeve-shaped arrangement, such as described in U.S. Pat. No. 6,250,193, which is hereby incorporated by reference herein in its entirety. This sleeve-shaped arrangement has elongate strands that are routed along the length of the sleeve and are woven together with helical strands. However, when provided in a strap-like arrangement (e.g., by flattening the arrangement), some of the elongate strands overlie the other elongate strands (e.g., the elongate strands do not have a planar and/or parallel relationship). When these sleeve-shaped arrangements are routed over a non-uniform (e.g., curved) surface, such as when routed over a pulley or around a corner of a parcel, the elongate strands furthest away from the curved surface bear more of the tension and thus are more susceptible to wear and failure. As a result, when so used, these sleeve-shaped arrangements can have poor overall break efficiency. To increase break efficiency, additional elongate strands can be included and/or the thicknesses of the elongate strands can be increased to achieve a desired tensile strength, which can be costly, inefficient, and can result in a bulky arrangement.

Referring again to FIG. 1, each portion of the axial strands A-U that are shown to be routed under and around the first and second boundary strands 12, 14 can overlap a portion of an adjacent axial strand. With regard to axial strand A in FIG. 1, for example, a portion of the axial strand A that is routed under and around the first boundary strand 12 can overlap a portion of axial strand B. Similarly, a portion of the axial strand A that is routed under and around the second boundary strand 14 can overlap a portion of axial strand B. With each of the axial strands overlapping adjacent axial strands along the first and second boundary strands 12, 14, the axial strands A-U can cooperate to entirely cover (or at least substantially entirely cover) the first and second boundary strands 12, 14. The axial strands A-U can accordingly serve as a protective covering that protects the first and second boundary strands 12, 14 from abrading/chafing.

Referring again to FIG. 3, the interior longitudinal strands 16 and 30 shown to have respective diameters d1 and d2 and the first and second boundary strands 12, 14 are shown to have respective diameters d3 and d4. In one embodiment, the ratio of each of the respective diameters d3 and d4 of the first and second boundary strands 12, 14 to the respective diameters d2, d2 of the adjacent interior longitudinal strands 16, 30 is less than about 1:2. It is to be appreciated that, by providing the first and second boundary strands 12, 14 with smaller diameters than the adjacent inner strands 16 and 30, the overlapping of the axial strands along the first and second boundary strands 12, 14 can be achieved.

It is to be appreciated that any of a variety of suitable braiding methods, currently known or hereafter developed are contemplated for manufacturing the strap 10. In one embodiment, a twist of between about 3% to about 5% can be imparted on the longitudinal strands during braiding of the axial strands A-U along the longitudinal strands. Such a twist can increase the overall break efficiency of the longitudinal fibers. In such an embodiment, the axial strands A-U can be wound tight enough to maintain the twist in the longitudinal strands once the manufacturing process is complete. In another embodiment, tension can be applied in a direction opposite to the feed direction of the braiding machine to the longitudinal strands during braiding of the axial strands A-U. In such an embodiment, the negative tension can enhance the parallel relationship and/or the planar relationship among the longitudinal strands described above.

Figure 4:
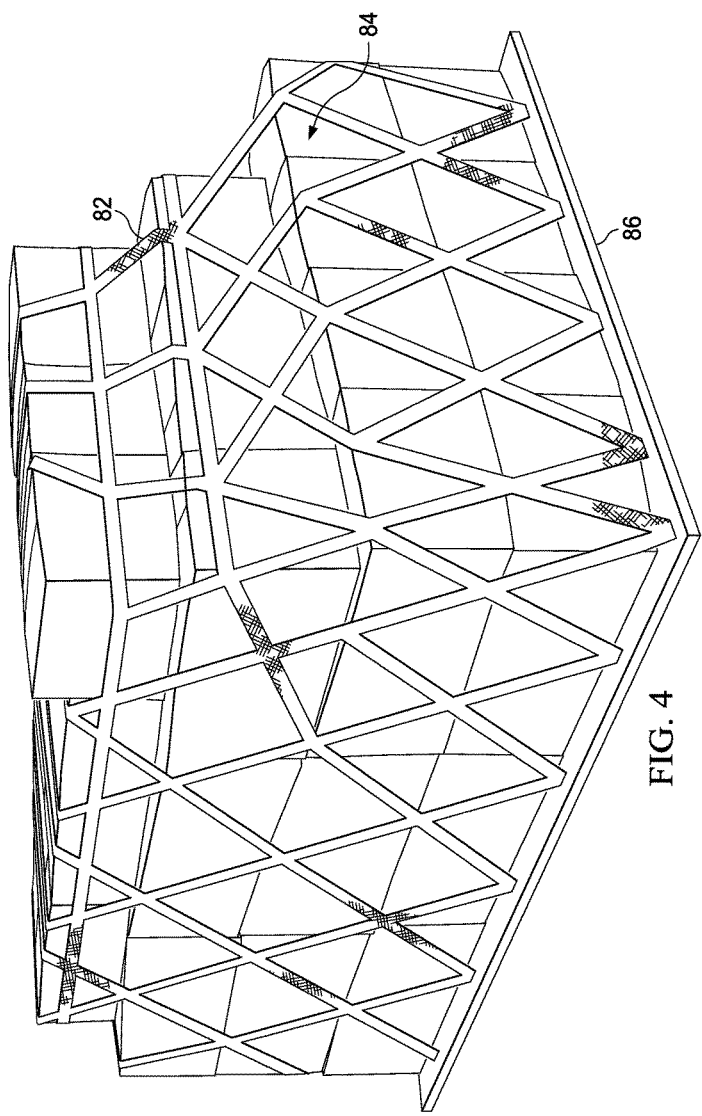
FIG. 4 is a perspective view of a cargo net overlying cargo on a pallet.

Referring now to FIG. 4, an example cargo net 82 is depicted that overlies and facilitates selective securement of cargo 84 to a pallet 86. The cargo net 82 can include sections of the strap 10. In one embodiment, the sections of the strap 10 can be stitched together using any of a variety of suitable methods. It will be appreciated that the cargo net 82 can be selectively secured to the pallet 86 using any of a variety of suitable releasable fastening methods, such as with clips, fasteners, staples, lashing, or the like. A cargo net formed of the strap 10 can be more cost effective, lightweight, and efficient than conventional cargo nets. It will be appreciated that the cargo net 82 can be used in any of a variety of cargo applications, such as for securing cargo within a cargo bay of a vehicle (e.g., truck or airplane).

EXAMPLES

Comparative Examples 1, 2 and 3 were conventionally formed as woven straps while the Inventive Example was formed as a triaxially braided strap (as described herein). Each of Comparative Examples 1, 2 and 3 and the Inventive Example were formed from two different fibers, namely a Polyester fiber (e.g., a polyester-based fiber having a denier of 2600) and a UHMWPE fiber (e.g., an ultra-high molecular weight polyethylene fiber having a denier of 1600). Comparative Example 1 included 50 ends of the UHMWPE fibers and no ends of Polyester fibers, and had a width of about 0.75 inch. Comparative Example 2 included 35 ends of UHMWPE fibers and no ends of Polyester fibers, and had a width of about 0.4365 inch. Comparative Example 3 included 25 ends of UHMWPE fibers and 25 ends of Polyester fibers, and had a width of about 0.625 inch.

The average actual break strength for each of the comparative and inventive examples was calculated by measuring the actual break strength of at least 3 samples of the respective comparative or inventive example, and then taking a numerical average. A conventional device, such as an Instron® testing system, was used to measure the actual break strength values for each of the respective samples, using techniques known to those skilled in the art. The actual break strength was measured in pounds (lbs.).

Next, the theoretical break strength was determined for each of the comparative and inventive examples using known tensile values for the given materials. For each of Comparative Examples the break strength for a single UHMWPE fiber was multiplied by the number of ends of UHMWPE fibers used, and added to the break strength of a single polyester fiber multiplied by the number of ends of Polyester fibers used. For example, for Comparative Example 1, since there were 50 ends of UHMWPE fibers and the break strength of such fibers was reported as 112.7 lbs. and there were no ends of Polyester fibers present, the theoretical break strength was 5635 lbs. (50×112.7 lbs.=5635 lbs.)

However, since the Inventive Example was formed using the triaxial braid the theoretical break strength was measured differently. Here, the theoretical break strength was determined by multiplying the number of ends of UHMWPE fibers (e.g., 2) by the break strength of a single UHMWPE fiber (e.g., 123 lbs.) and then adding this value to the number of ply ends of UHMWPE fibers (e.g., 8) by the break strength of one end of four ply UHMWPE fibers (e.g., 434 lbs.). Thus, resulting in a theoretical break strength of 3718 lbs. (2×123 lbs.)+(8×434 lbs.)=3718 lbs.

Once the average actual break strength and theoretical break strength were determined, the break efficiency was calculated. The break efficiency was calculated by dividing the average actual break strength by the theoretical break strength and multiplying by 100. The break efficiencies were reported as percentages.

TABLE 1

|  | Comparative Example 1 | Comparative Example 2 | Comparative Example 3 | Inventive Example |
|---|---|---|---|---|
| % of strap formed of Polyester fibers | 26 | 27 | 43 | 47 |
| % of strap formed of UHMWPE fibers | 74 | 73 | 57 | 53 |
| Width of Strap (in.) | 0.75 | 0.44 | 0.63 | 0.63 |
| Average Actual Break Strength (lb.) | 2717 | 2513 | 2755 | 3540 |
| Theoretical Break Strength (lb.) | 5635 | 3945 | 4035 | 3718 |
| Break Efficiency (%) | 48.2 | 63.7 | 68.3 | 95.2 |

Straps arranged and formed of materials as described herein can have numerous benefits. One such benefit is the increase in the overall actual break strength of these straps. Actual break strength is a measure of the durability of the strap under pressure or load. The higher the actual break strength the more stress the strap can endure. As noted above in Table 1, the triaxial braid of the strap of the Inventive Example provides higher actual break strength over the conventionally woven straps, Comparative Examples 1-3. However, a significant and telling advantage of the triaxial braid of the Inventive Example is how much higher the break efficiency is over Comparative Examples 1-3 (e.g., 95% vs. 68%). This improvement in efficiency in the Inventive Example illustrates that the triaxial braid makes better use of the strength of each of the fibers employed in the strap. Thus, the vast improvement in efficiency makes for a stronger and less costly strap.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A triaxially braided strap comprising:
   a plurality of axial strands;
   a first boundary strand;
   a second boundary strand;
   a first interior longitudinal strand having a first upper portion and a first lower portion; and
   a second interior longitudinal strand having a second upper portion and a second lower portion, each of the first boundary strand, the second boundary strand, the first interior longitudinal strand, and the second interior longitudinal strand being substantially parallel to one another, wherein:
   each axial strand of the plurality of axial strands is routed, in a repeating pattern and in the following order:

under the first interior longitudinal strand such that a portion of the axial strand is routed along the first lower portion of the first longitudinal strand;

between respective portions of a first pair of the axial strands that are routed between the first interior longitudinal strand and the first boundary strand;

over the first boundary strand;

around the first boundary strand to at least partially wrap the first boundary strand;

between respective portions of a second pair of the axial strands that are routed between the first boundary strand and the first interior longitudinal strand;

over the first interior longitudinal strand such that a portion of the axial strand is routed along the first upper portion of the first longitudinal strand;

between respective portions of a third pair of the axial strands that are routed between the first interior longitudinal strand and the second interior longitudinal strand;

under the second interior longitudinal strand such that a portion of the axial strand is routed along the second lower portion of the second longitudinal strand;

between respective portions of a fourth pair of the axial strands that are routed between the second interior longitudinal strand and the second boundary strand;

over the second boundary strand;

around the second boundary strand to at least partially wrap the second boundary strand;

between respective portions of a fifth pair of the axial strands that are routed between the second boundary strand and the second interior longitudinal strand;

over the second interior longitudinal strand such that a portion of the axial strand is routed along the second upper portion of the second longitudinal strand; and between respective portions of a sixth pair of the axial strands that are routed between the second interior longitudinal strand and the first interior longitudinal strand; wherein:

the first interior longitudinal strand and the second interior longitudinal strand are disposed between the first boundary strand and the second boundary strand;

the first boundary strand and the second boundary strand are outermost longitudinal strands;

each portion of the axial strands that is routed along the first upper portion of the first longitudinal strand is substantially parallel with adjacent portions of the axial strands routed along the first upper portion of the first longitudinal strand;

each portion of the axial strands that is routed along the first lower portion of the first longitudinal strand is substantially parallel with adjacent portions of the axial strands routed along the first lower portion of the first longitudinal strand;

each portion of the axial strands that is routed along the second upper portion of the second longitudinal strand is substantially parallel with adjacent portions of the axial strands routed along the second upper portion of the second longitudinal strand; and each portion of the axial strands that is routed along the second lower portion of the second longitudinal strand is substantially parallel with adjacent portions of the axial strands routed along the second lower portion of the second longitudinal strand.

2. The triaxially braided strap of claim 1 wherein:

each portion of an axial strand of the axial strands that is routed under and around the first boundary strand overlaps a portion of an adjacent one of the axial strands; and each portion of an axial strand of the axial strands that is routed under and around the second boundary strand overlaps another portion of the adjacent axial one of the axial strands.

3. The triaxially braided strap of claim 1 wherein:

the first boundary strand has a first diameter;

the second boundary strand has a second diameter;

the first interior longitudinal strand has a third diameter; and the ratio of each of the first diameter and the second diameter to the third diameter is less than about 1:2.

4. The triaxially braided strap of claim 1 wherein at least one of the first boundary strand, the second boundary strand, the first interior longitudinal strand, and the second interior longitudinal strand is twisted by between about 3% and about 5%.

5. The triaxially braided strap of claim 1 wherein each of the plurality of axial strands has a tenacity value of less than about 15 grams per denier and each of the first interior longitudinal strand, the second interior longitudinal strand, the first boundary strand, and the second boundary strand has a tenacity value of greater than or equal to about 15 grams per denier.

6. The triaxially braided strap of claim 5 wherein each of the plurality of axial strands are formed of one or more polyester fibers.

7. The triaxially braided strap of claim 5 wherein at least one of the first boundary strand, the second boundary strand, the first interior longitudinal strand, and the second interior longitudinal strand is formed of one or more of an ultra-high molecular weight polyethylene fiber and an aramid fiber.

8. The triaxially braided strap of claim 7 wherein at least one of the first boundary strand, the second boundary strand, the first interior longitudinal strand, and the second interior longitudinal strand is formed entirely of an ultra-high molecular weight polyethylene fiber.

9. The triaxially braided strap of claim 1 further comprising at least two additional interior longitudinal strands disposed between the first interior longitudinal strand and the second interior longitudinal strand.

10. The triaxially braided strap of claim 9 further comprises six interior longitudinal strands disposed between the first interior longitudinal strand and the second interior longitudinal strand.

11. The triaxially braided strap of claim 1 wherein each of the first pair of axial strands, the second pair of axial strands, and the third pair of axial strands are different from the fourth pair of axial strands, the fifth pair of axial strands, and the sixth pair of axial strands.

12. A cargo net comprising the triaxially braided strap of claim 1.

* * * * *